United States Patent
Chandran et al.

(10) Patent No.: US 7,990,081 B2
(45) Date of Patent: Aug. 2, 2011

(54) PULSE WIDTH MODULATION BASED LED DIMMER CONTROL

(75) Inventors: Manoj Chandran, Chandler, AZ (US); Alma Anderson, Chandler, AZ (US)

(73) Assignee: NXP B.V., Eindhoven (NL)

( * ) Notice: Subject to any disclaimer, the term of this patent is extended or adjusted under 35 U.S.C. 154(b) by 479 days.

(21) Appl. No.: 12/294,001

(22) PCT Filed: Mar. 20, 2007

(86) PCT No.: PCT/IB2007/050977
§ 371 (c)(1),
(2), (4) Date: Sep. 22, 2008

(87) PCT Pub. No.: WO2007/107958
PCT Pub. Date: Sep. 27, 2007

(65) Prior Publication Data
US 2009/0096392 A1    Apr. 16, 2009

Related U.S. Application Data

(60) Provisional application No. 60/784,963, filed on Mar. 21, 2006.

(51) Int. Cl.
    H05B 37/00    (2006.01)
    H05B 39/00    (2006.01)
    H05B 41/00    (2006.01)
(52) U.S. Cl. .................. 315/312; 340/815.45; 345/46
(58) Field of Classification Search .................. 315/312, 315/291, 317; 340/815.45; 345/46, 102; 362/800
See application file for complete search history.

(56) References Cited

U.S. PATENT DOCUMENTS

| | | | |
|---|---|---|---|
| 6,449,289 B1 | 9/2002 | Quicksall | |
| 7,317,403 B2 * | 1/2008 | Grootes et al. | 340/815.45 |
| 2004/0155608 A1 | 8/2004 | Trinschek et al. | |
| 2005/0243022 A1 | 11/2005 | Negru | |
| 2006/0244396 A1 | 11/2006 | Bucur | |
| 2007/0046485 A1 * | 3/2007 | Grootes et al. | 340/815.45 |

FOREIGN PATENT DOCUMENTS

| | | |
|---|---|---|
| CN | 101253813 A | 8/2008 |
| EP | 1589519 A | 10/2005 |
| EP | 1748411 A | 1/2007 |
| WO | 2007/023454 A1 | 3/2007 |

OTHER PUBLICATIONS

Philips Semiconductors: "HEF4094B MSI Data Sheet", HEF4094B, Jan. 1995. Texas Instrument: "CD74HC4094 Data Sheet-". CD74HC4094, Nov. 1997.
Yamaguchi, Hiroshi, et al. "Dimming Apparatus for Game Machine" Patent Abstracts of Japan, Publication No. 20030126371, Date of Publication: Jul. 5, 2003 (Computer Translation).

* cited by examiner

*Primary Examiner* — Daniel D Chang

(57) ABSTRACT

Methods and apparatus for implementing and operating pulse width modulation based LED dimmer controllers are described. A synchronization protocol is used to allow control information for the dimmer operations to be transferred to the PWM dimmer control clock domain from an external clock domain, such that visual artifacts are prevented when the control information is updated. Control information may be transferred to the LED dimmer controller via an I2C serial bus, and the synchronization protocol waits for an I2C STOP condition before updating control information across clock domain boundaries. The leading and trailing edges of an asserted group dimmer control signal are generated such that the active portion of the group dimmer control signal overlaps the active portion of individual LED pulse width modulated control signals. In this way, the pulse width modulation of the individual LED control signals is not cut off, or reduced in width by the group dimmer signal.

13 Claims, 2 Drawing Sheets

PULSE WIDTH MODULATION BASED LED DIMMER CONTROL

The present invention relates generally to methods and apparatus for LED dimmer control. The present invention more particularly relates to circuits and methods for providing pulse width modulated dimmer control for LEDs, dimming operations with multiple LEDs of different colors, and communicating dimmer control information between clock domains without introducing visual artifacts.

There have been many advances in lighting technology since the introduction of the incandescent light bulb. One of the more recent advances in lighting technology has been the development of the light emitting diode, or LED, as it is more commonly referred to today. These semiconductor based lighting products have many desirable qualities, such as, for example, small size, operation from low voltage power supplies, and ease of integration with control circuitry.

LEDs have evolved relatively quickly since their introduction, and are now widely used in product areas including consumer and industrial electronics, as well as in lighting applications. Some of the improvements have been in areas such as brightness, and the availability of a variety of colors. Other advances have come in terms of applications for these useful lighting elements, and in the circuits used to control them.

What is needed are methods and apparatus for providing LED dimmer controls that achieve the desired dimming while avoiding visual artifacts such as flashing during a dimming operation, and avoiding conventional circuit performance errors that affect LED brightness.

Briefly, methods and apparatus for implementing and operating pulse width modulation based LED dimmer controllers are described.

In one aspect of the present invention, a synchronization protocol is used to allow control information for the dimmer operations to be transferred to the PWM dimmer control clock domain from an external clock domain, such that visual artifacts are prevented when the control information is updated.

In a further aspect of the present invention, control information is transferred to the LED dimmer controller via an I2C serial bus, and the synchronization protocol waits for an I2C STOP condition before updating control information across clock domain boundaries.

In a still further aspect of the present invention, the leading and trailing edges of an asserted group dimmer control signal are generated such that the active portion of the group dimmer control signal overlaps the active portion of individual LED pulse width modulated control signals. In this way, the pulse width modulation of the individual LED control signals is not cut off, or reduced in width by the group dimmer signal.

Figure 1:
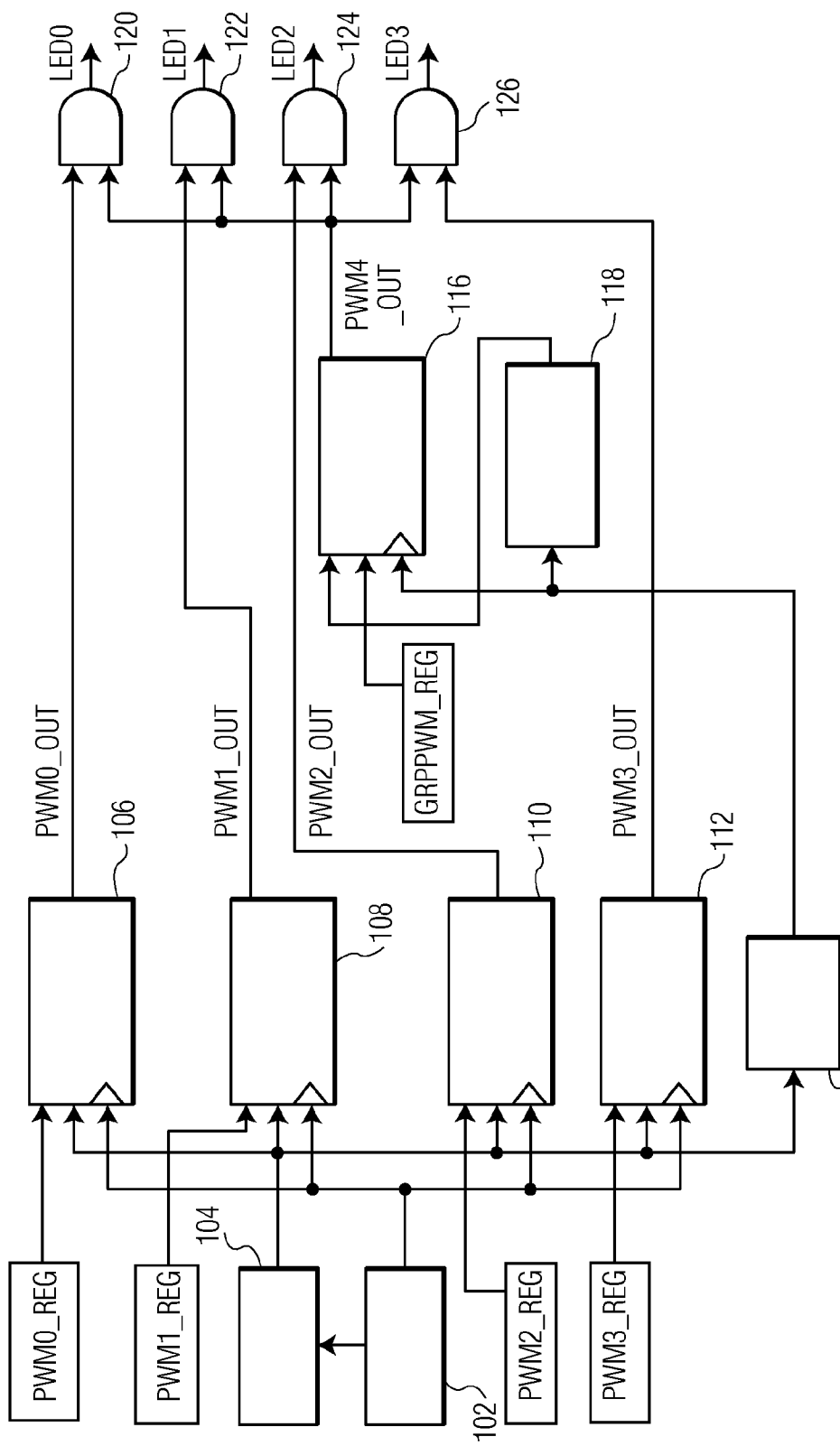
FIG. 1 is a schematic block diagram of a circuit in accordance with the present invention.

Generally, the present invention relates to LED dimmer controls. Various aspects of the present invention relate more particularly to circuits and methods for providing pulse width modulated dimmer control for LEDs, dimming operations with multiple LEDs of different colors, and communicating dimmer control information between clock domains without introducing visual artifacts.

Reference herein to "one embodiment", "an embodiment", or similar formulations, means that a particular feature, structure, operation, or characteristic described in connection with the embodiment, is included in at least one embodiment of the present invention. Thus, the appearances of such phrases or formulations herein are not necessarily all referring to the same embodiment. Furthermore, various particular features, structures, operations, or characteristics may be combined in any suitable manner in one or more embodiments.

The terms integrated circuit, IC, chip, die, semiconductor device, monolithic integrated circuit, microelectronic device, and similar variants may be used interchangeably herein. With respect to these microelectronic devices, signals are coupled between them and other circuit elements, including but not limited to other microelectronic devices, via physical, electrically conductive connections. The point of connection is sometimes referred to as an input, output, input/output (I/O), terminal, line, pin, pad, port, interface, or similar variants and combinations. Unless specifically noted in the context of use, these are considered equivalent terms for the purpose of this disclosure.

Various embodiments of the present invention provide systems and methods to cleanly control the dimming of LEDs, both individually and as a group, using pulse width modulation, and without producing visual artifacts from such dimming control. Pulse width modulation is an efficient way of controlling LEDs. By varying the ON and OFF time of an LED, and using the various different color LEDs (e.g., R, G, B, and Y) that are now available, it is possible to create color mixing that is visible to the human eye. The human eye averages the brightness of the different color LEDs thereby creating the perception of seeing different colors. Further, by pulsing electrical current through the LEDs at a high enough frequency (typically greater than 2 kHz) the human eye perceives a dimming effect.

There are a number of challenges which are overcome by LED dimmer controllers in accordance with the present invention. Such LED dimmer controllers provide for dimming LEDs without producing various undesirable visual artifacts. For example, in addition to achieving the desired dimming of the LED outputs, an LED dimmer controller in accordance with the invention avoids visual artifacts such as sudden flashes of light during the dimming process; and avoids chopping off the original waveform with the dimming waveform and accordingly avoids visual artifacts such as changing the original brightness of an LED.

A pulse width modulated LED dimmer controller (or simply LED dimmer) typically includes registers that are capable of being controlled, or accessed, from the external world. In typical applications for LED lighting products equipped with pulse width modulated LED dimmers, it is preferable that access to the registers of the dimmer be by a simple mechanism. In an illustrative embodiment of the present invention, which is described below, an I2C serial bus interface is used for providing access to these registers. It is noted that, in this scenario, an LED dimmer resides on a first chip, and control information is sent to the first chip from a second chip, via an I2C serial bus. Additionally, the illustrative embodiment uses an on-chip oscillator to provide the pulse width modulation (PWM) circuit with the required base clock frequency that is used to achieve the pulse width modulation of the dimmer control signals. Pulse width modulation of these dimmer control signals may be achieved by completely synchronous logic including counters and comparators.

In the illustrative example described below, there are multiple LEDs each with a PWM control circuit for controlling the perceived brightness of that LED, as well as circuitry for dimming the LEDs as a group. The control circuits for both the individual and group dimming operations are implemented in an integrated circuit and include various registers internal to that integrated circuit. In order to specify various brightness and dimming control parameters, a user may cause information to be written to those internal registers, which in turn, controls the individual LED dimming PWM, and the group LED dimming PWM circuits.

In the illustrative embodiment, the writes, or data transfers, to the internal registers are done via an I2C serial interface that is mostly synchronous, i.e., except for the asynchronous Start and Stop conditions of the I2C protocol. These write operations occur within the SCL clock domain (defined by the I2C master device), which is described in more detail below. Within the LED dimmer chip an internal oscillator generates a base clock, which is divided and used in the individual and group PWM circuits, thereby creating an oscillator (OSC) clock domain.

When new values are written to the registers, embodiments of the present invention advantageously ensure that clean control parameter updates result in LED outputs without visual artifacts being detected by an observer.

The block diagram of FIG. 1 shows an illustrative embodiment of the present invention. An oscillator 102 provides a clock signal to an 8-bit counter 104. The clock signal of oscillator 102 is further coupled the clock input terminals of comparators Pwm0 106, Pwm1 108, Pwm2 110, and Pwm3 112. Comparators Pwm0 106, Pwm1 108, Pwm2 110, and Pwm3 112 are further coupled in common to receive an output signal from 8-bit counter 104. Additionally, comparators Pwm0 106, Pwm1 108, Pwm2 110, and Pwm3 112 are coupled to receive, respectively, the outputs from registers Pwm0$_{13}$reg, Pwm1$_{13}$reg, Pwm2$_{13}$reg, and Pwm3$_{13}$reg. A clock divider 114 is coupled to receive the output signal of 8-bit counter 104. The output of clock divider 114 is coupled to 8-bit counter 118, and to comparator Pwm4 116. Comparator Pwm4 116 is further coupled to receive the output of control register Grppwm reg, and to receive the output of 8-bit counter 118. A first AND gate 120 is coupled to receive the output of comparator Pwm0 106 and the output of comparator Pwm4 116; and produces an output signal LED0 for controlling a first LED. A second AND gate 122 is coupled to receive the output of comparator Pwm1 108 and the output of comparator Pwm4 116; and produces an output signal LED1 for controlling a second LED. A third AND gate 124 is coupled to receive the output of comparator Pwm2 110 and the output of comparator Pwm4 116; and produces an output signal LED2 for controlling a third LED. A fourth AND gate 126 is coupled to receive the output of comparator Pwm3 112 and the output of comparator Pwm4 116; and produces an output signal LED3 for controlling a fourth LED. In this illustrative embodiment, each of the first second, third and fourth LEDs (not shown) emits a different color of light.

Those skilled in the art and having the benefit of this disclosure will recognize that alternative combinational logic and/or signal polarities may be used to achieve the illustrated functionality.

Still referring to the block diagram of FIG. 1, this illustrative implementation has four individual PWMs (Pwm0 through Pwm3) for individual LED brightness control, and one group PWM (Pwm4) for group dimming. It is noted that instead of group dimming, the same techniques can be used to achieve individual dimming controls as well. The individual PWMs are clocked by different divided down versions of the OSC clock (which is derived from an internal oscillator in this illustrative embodiment). The individual brightness control for the four LEDs is achieved by the user changing the values of Pwm0_reg through Pwm3_reg. Register writes occur through an I2C interface front end in this example. The group dimming control can be achieved by changing the value of the register Pwm4_reg.

Those skilled in the art will be familiar with the well-known I2C two-wire serial bus developed by Philips, and now used by a wide variety of semiconductor manufacturers under license from Philips. The I2C protocol, which is a master/slave protocol, uses one line for serial data, which is well-known as SDA, and one line for a serial clock, which is well-known as SCL. The I2C master device produces the SCL clock signal. The I2C protocol specifies timing, addressing, clocking, data transfer, acknowledgments, voltage levels, and so on It is noted that the I2C clock, Serial Clock (SCL), is not a continuous clock. The SCL signal can be stopped and started at any time by the I2C master device. Additionally, in accordance with the I2C protocol, data on the SDA line must be valid when the clock signal on the SCL line is high, with two exceptions. A high-to-low transition on the SDA line while the clock signal on the SCL line is high, is interpreted as a "START" condition. A low-to-high transition on the SDA line while the clock signal on the SCL line is high, is interpreted as a "STOP" condition.

Since the I2C two-wire serial bus is widely known and commonly available from many manufacturers, a further detailed discussion of it is not presented here.

Figure 2:
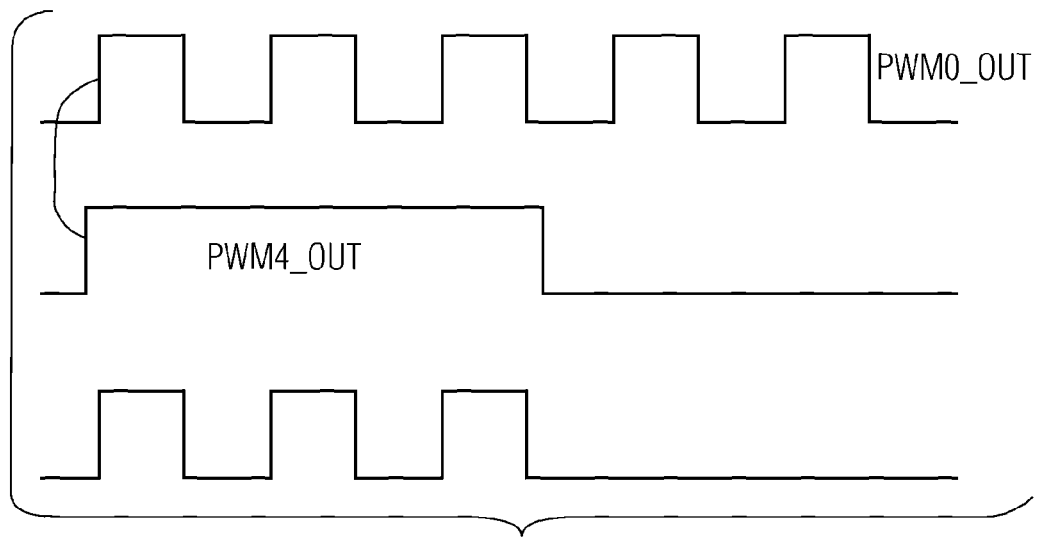
FIG. 2 is a timing diagram showing a pulse width modulated control signal for a single LED, a group-level dimming signal, and the resultant waveform and logically combining the first two signals to produce of dimmer output signal.

FIG. 2 illustrates the basic timing waveforms for the dimmer control. The first waveform is the output of the individual PWM. The second waveform is the output of the group dimmer PWM. The third waveform is the resultant dimming waveform. The operation of the LED dimmer controller can be seen from an inspection of the waveforms shown in FIG. 2. Due to the group dimmer signal, the resultant waveform has different ON and OFF times. This change in the average brightness of the LED is perceived by the human eye, which does an averaging operation, as dimming. It can be seen that by changing the value of the Pwm4_reg, the pulse width modulated output of the group PWM can be changed, which enables control of the resultant waveform, and hence provides for control of dimming the LED outputs.

Assume that the user had initially set up the individual PWM to be on 50% and off 50%. This would correspond to a particular brightness. Now if the user wants to dim the LED output, the Pwm4_reg value would be set up to reduce output brightness let us say by 25%. This should reduce the LED brightness by 25%. However, an LED dimmer controller in accordance with the invention must take into account factors such as, but not limited to, the following: the user interface operates at a different frequency (SCL clock domain) from the PWM frequency (OSC clock domain), hence there needs to be a clean handshake between these two clock domains; and the process of updating the LED outputs should be a smooth one rather than an abrupt one. The resulting update should happen so cleanly that the human eye does not perceive an abrupt switch.

A method of updating all the LEDs together is provided by a mechanism referred to herein as "update on STOP".

In the update on STOP method, when the user updates the dimmer control registers, which are in the SCL clock domain, the updates to the circuits in the OSC clock domain are held off until a STOP condition is issued on the I2C bus. This procedure ensures that all four LEDs in this illustrative embodiment will be updated to their respective specified brightness level at the same time. In this way, the situation in which the human eye perceives different colors changing before dimming is avoided. For example, if the original combination of the individual LED brightness values resulted in a bright purple color, by using this method the dimming operation would result in a dim purple color instead of a bright purple changing abruptly into some other color before settling down to the final dim purple color.

The actual update in the OSC clock domain is carefully controlled so that there are no visual artifacts resulting from the transfer of data across clock domain boundaries. This is achieved by a robust, synchronous, digital control mechanism. The illustrative PWM implementation is a counter/comparator implementation. A free running counter counts the number of clocks. A comparator compares the Pwm4_reg value with the counter to see if there is a match. If there is a match, then the Pwm4 output is asserted.

Figure 3:
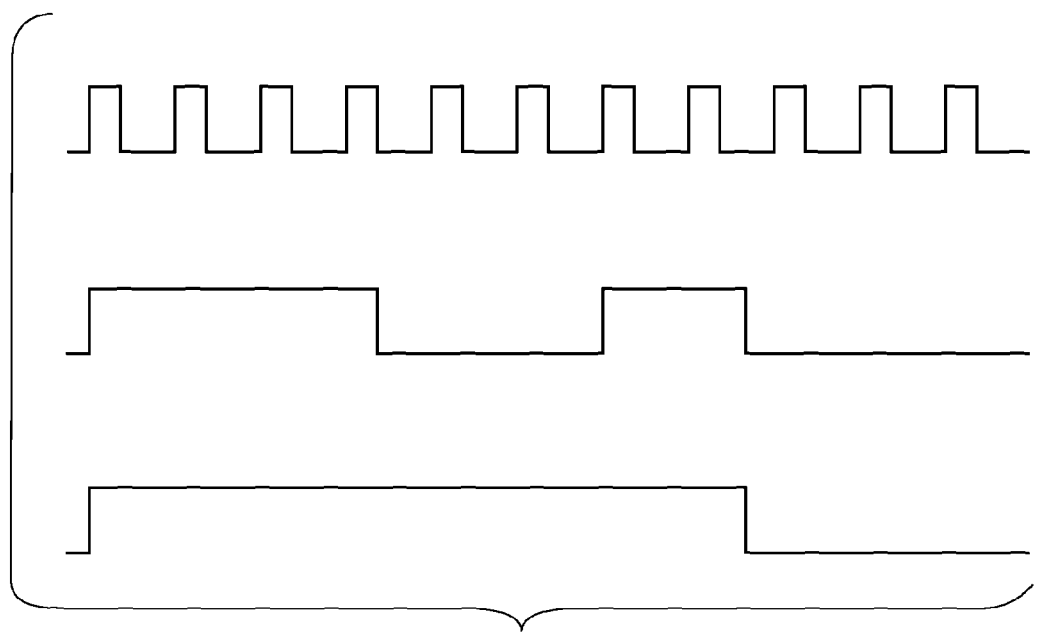
FIG. 3 is a timing diagram showing the effects of following and not following the data transfer procedures in accordance with the present invention.

As noted, it is desired to avoid visual artifacts when dimming the LED light output. A method for avoiding such visual artifacts includes determining that the Pwm4_reg in the SCL domain has been updated, and waiting for a STOP condition. Once the STOP condition occurs in the SCL clock domain, a clean clock boundary hand-shake across to the OSC clock domain is performed and a flag is set in the OSC clock domain. Subsequently, a wait state occurs until the Pwm4 counter in the OSC clock domain cleanly rolls over to zero. At this point in time, the Pwm4_reg shadow register in the OSC clock domain is updated to the new value. This procedure ensures that the new dim waveform is artifact-free. FIG. 3 illustrates the effect of following and not following the above-described procedure.

To achieve the objective of not chopping the original waveform (and hence changing the original brightness characteristics of the LEDs), various embodiments of the present invention include ensuring that the leading and trailing edges of the dimming waveform are separated in time from the original waveform. Those skilled in the art and having the benefit of this disclosure will appreciate that there are many different ways to implement circuitry for this purpose. It will be further appreciated that careful attention is paid to the digital counter design and comparator design to ensure the edge separations described above are achieved. In designing an LED dimmer controller, in accordance with the present invention, that is to be implemented as an integrated circuit, post-layout back annotated timing results should be analyzed to ensure that even after layout the above-described edge separations are valid. Integrated circuit designers will appreciate the value of this procedure, since the change in timing of various signals at the different semiconductor manufacturing process corners can affect the desired circuit behavior. It needs to be ensured that the smallest possible group dimming pulse is equal to or greater than the largest possible individual PWM pulse.

Circuits, systems, and methods suitable for use in LED dimmer control applications have been described. Various embodiments of the present invention provide pulse width modulation based LED dimmer controllers having control registers that receive data from a first clock domain, while the LED control signals are generated in a second clock domain. Visual artifacts that conventionally result from updating such control registers are eliminated by embodiments of the present invention.

A number of advantages are provided by embodiments of the present invention. One advantage is that the visual artifacts, such as a flash of light during a dimming operation are eliminated.

Another advantage is that synchronous digital designs in accordance with the present invention are verifiable through modern simulators and static timing analysis tools.

It is noted that various embodiments of the present invention can be applied to any LED dimmer application including group, individual, or both.

It is further noted that although the illustrative embodiment was described with an I2C front end, those skilled in the art and having the benefit of the present disclosure will recognize that other front end protocols can be used, and the present invention is not limited to use with an I2C interface.

It is to be understood that the present invention is not limited to the embodiments described above, but encompasses any and all embodiments within the scope of the subjoined Claims and their equivalents.

The invention claimed is:

1. A method of controlling an LED based lighting product having a plurality of LEDs, the method comprising:
    generating a first base clock, the first base clock defining a first clock domain;
    generating, within the first clock domain, a plurality of pulse width modulated LED control signals, each of the plurality of pulse width modulated LED control signals being associated with at least one LED;
    generating, within the first clock domain, a pulse width modulated group dimmer signal; and
    logically combining the group dimmer signal with each of the plurality of pulse width modulated LED control signals;
    wherein the group dimmer signal is generated such that the shortest pulse of the group dimmer signal is longer than the longest pulse of any of the plurality of pulse width modulated LED control signals;
    wherein generating each of the plurality of pulse width modulated LED control signals is based, at least in part, on the content of a control register associated with a pulse width modulator for each of the plurality of pulse width modulated LED control signals; and
    wherein generating the group dimmer signal is based, at least in part, on the content of a control register associated with a pulse width modulator for the group dimmer signal.

2. The method of claim 1, further comprising receiving, from a second clock domain, updated content for each control register associated with a pulse width modulator for each of the plurality of pulse width modulated LED control signals.

3. The method of claim 1, further comprising receiving, from a second clock domain, updated content for the control register associated with a pulse width modulator for the group dimmer signal.

4. The method of claim 1, further comprising receiving, via an I2C serial bus, updated content for each control register associated with a pulse width modulator for each of the plurality of pulse width modulated LED control signals, and updated content for the control register associated with the pulse width modulator for the group dimmer signal.

5. The method of claim 4, further comprising determining that an I2C STOP condition has occurred prior to transferring the updated content for each control register associated with the pulse width modulator for each of the plurality of pulse width modulated LED control signals, and updated content for the control register associated with the pulse width modulator for the group dimmer signal, to the first clock domain.

6. The method of claim 5, further comprising setting a flag in the first clock domain responsive to determining that an I2C STOP condition has occurred.

7. The method of claim 1, wherein the plurality of LEDs includes LEDs of different colors.

8. A pulse width modulation based LED dimmer, comprising:
   a first oscillator circuit;
   a first counter coupled to the first oscillator circuit;
   a plurality of individual pulse width modulator circuits, each of the plurality of pulse width modulator circuits associated with an LED, and each coupled to the first oscillator circuit and the first counter;
   a plurality of control registers, each of the plurality of control registers associated with at least one of the plurality of individual pulse width modulator circuits; and
   a group dimmer pulse width modulator circuit, and a control register associated therewith, the group dimmer pulse width modulator circuit coupled to receive a divided down version of an output of the first counter;
   wherein the pulse width modulator circuits reside in a first clock domain defined by the first oscillator circuit; and the plurality of control registers and the control register associated with the group dimmer pulse width modulator circuit are adapted to receive control information that originates in a second clock domain.

9. The pulse width modulation based LED dimmer of claim 8, further comprising combinational logic gates for logically combining output signals of the plurality of individual pulse width modulator circuits with an output signal of the group dimmer pulse width modulator circuit.

10. The pulse width modulation based LED dimmer of claim 9, further comprising an I2C serial bus interface coupled to the control registers.

11. The pulse width modulation based LED dimmer of claim 10, further comprising a flag operable to be set when an I2C STOP condition is detected.

12. The pulse width modulation based LED dimmer of claim 9, wherein the combinational logic gates are coupled to LEDs.

13. A method of controlling an LED based lighting product having a plurality of LEDs, the method comprising:
   generating a first base clock, the first base clock defining a first clock domain;
   generating, within the first clock domain, a plurality of pulse width modulated LED control signals, each of the plurality of pulse width modulated LED control signals being associated with at least one LED;
   generating, within the first clock domain, a pulse width modulated group dimmer signal; and
   logically combining the group dimmer signal with each of the plurality of pulse width modulated LED control signals;
   wherein the group dimmer signal is generated such that the shortest pulse of the group dimmer signal is longer than the longest pulse of any of the plurality of pulse width modulated LED control signals;
   wherein generating each of the plurality of pulse width modulated LED control signals is based, at least in part, on the content of a control register associated with a pulse width modulator for each of the plurality of pulse width modulated LED control signals; and
   further comprising receiving, from a second clock domain, updated content for each control register associated with a pulse width modulator for each of the plurality of pulse width modulated LED control signals.

* * * * *